C. W. GRAHAM.
SOLDERING MACHINE.
APPLICATION FILED FEB. 9, 1905.
983,821.
Patented Feb. 7, 1911.
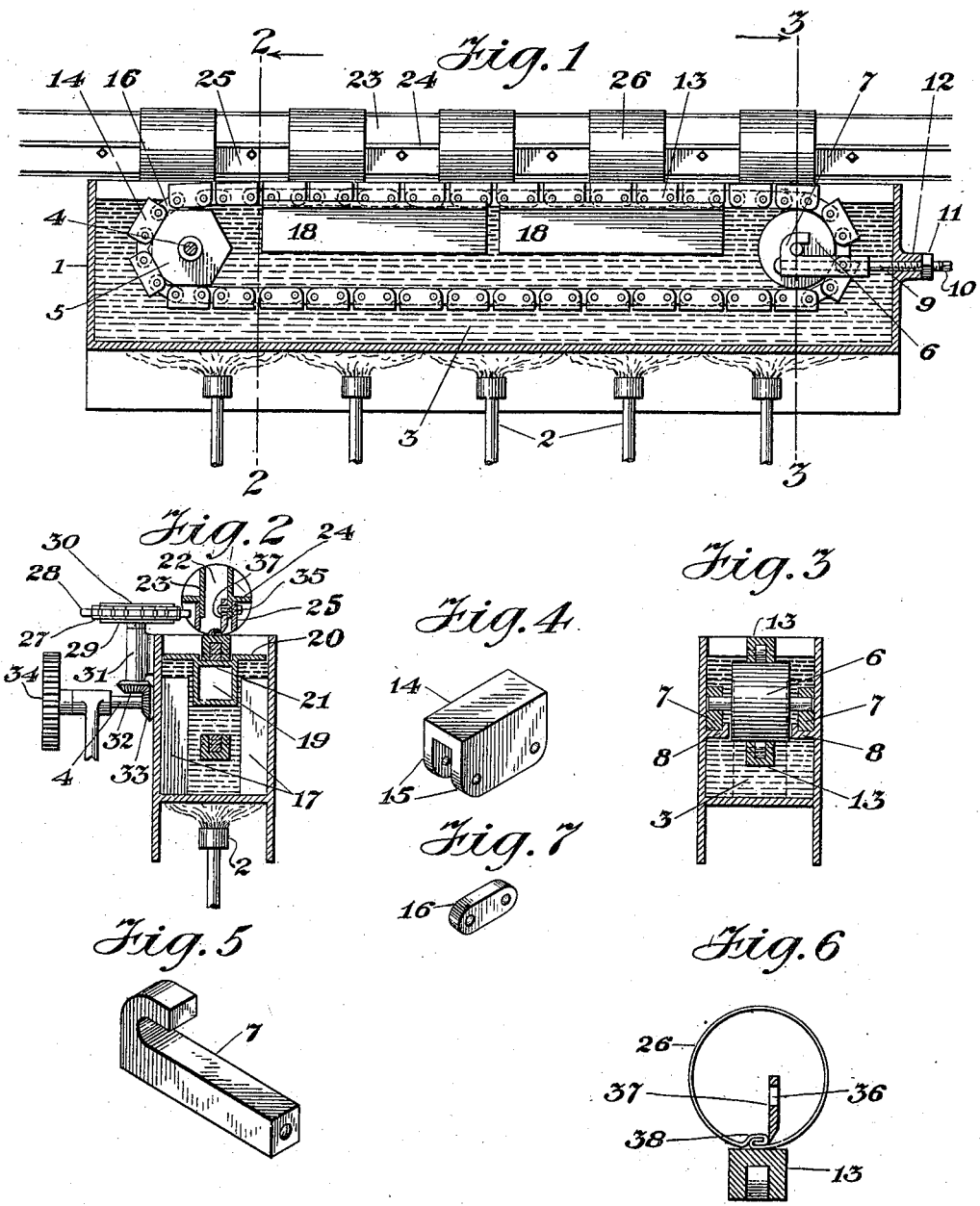
Witnesses
Chas. F. Clagett
Robert S. Blau
Inventor
C. W. Graham
By his Attorneys

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

SOLDERING-MACHINE.

983,821. Specification of Letters Patent. Patented Feb. 7, 1911.

Application filed February 9, 1905. Serial No. 244,833.

*To all whom it may concern:*

Be it known that I, CHARLES W. GRAHAM, residing at Rome, in the county of Oneida and State of New York, have invented certain new and useful Improvements in Soldering-Machines, of which the following is a full, clear, and exact description, such as will enable others skilled in the art to which it appertains to make and use the same.
This invention relates to machinery for applying solder or other material. One of the objects thereof is to provide efficient means of the above type which shall be continuous in action.
Another object is to provide simple means of the above type in which the solder is applied with substantially uniform pressure independent of the expansion or contraction of parts of the machine.
Still another object is to provide a soldering machine which is adapted to thoroughly solder all parts of the seam.

Other objects will be in part obvious and in part pointed out hereinafter.
The invention, accordingly, consists of the features of construction, combination of elements, and arrangements of parts which will be exemplified in the machine hereinafter described, and the scope of the application of which will be indicated in the following claims.

In the accompanying drawings, wherein is shown one of various possible embodiments of my invention: Figure 1 is a longitudinal sectional view of the same, certain parts thereof being shown in full in order to disclose the structure more clearly. Fig. 2 is a cross section taken substantially on the line 2—2 of Fig. 1. Fig. 3 is a similar view taken on the line 3—3 of Fig. 1, certain parts being omitted. Fig. 4 is a detailed perspective view of a block used in this embodiment of my invention. Fig. 5 is a similar view of a supporting hook. Fig. 6 is a detailed section showing the relative position of a can and some of the co-acting parts. Fig. 7 is a detailed perspective view of a link.

Similar reference characters refer to similar parts throughout the several views of the drawing.

In order to render clearer the general nature of my invention, it may first be noted that if, in a machine of the general type with which this invention deals, the solder applying members are rigidly supported with reference to the can supporting members, the expansion or contraction of the parts, due to the varying degrees of heat to which they are subjected, is likely to render the application of the solder uneven and unequal. It may also here be noted that if the action in a soldering machine is not continuous throughout a considerable period of time, the same is likely not to thoroughly sweat the solder into the seams. Another defect in machines of this nature now in general use is that the solder is not sweated into all parts of the seam. The above and other defects are remedied in constructions of the nature of that hereinafter described.

Referring now to the drawing, 1 represents a tank or receptacle provided with suitable heat-applying means 2 and adapted to contain molten solder 3 to any desired level. Mounted in the walls of this receptacle adjacent one end thereof is a shaft 4 provided with a sprocket wheel 5, which, in this instance, is shown as a hexagonal pulley. A corresponding pulley 6 is mounted in the opposite end of the tank within hook-shaped bearings 7, resting upon fins 8 projecting inwardly from the walls of the tank. Bearings 7 are perforated longitudinally for the reception of adjusting bolts 9 which pass through the end of the tank and are squared as shown at 10 and provided with nuts 11. These bolts are threaded into suitable bosses 12 in the ends of the walls of the tank and it will readily be seen that by means of turning the same, the nuts being loosened, the bearings of pulley 6 may be adjusted as desired. A chain 13 passes over the sprocket wheel 5 and pulley 6 and is preferably built up in the following manner. A series of blocks 14 provided with dependent flanges 15 are connected by means of short links 16, each link being pinned between adjacent ends of flanges 15 of the blocks which it connects. In this manner, a chain is provided which during its travel between the sprocket wheel and pulley affords a substantially uniform surface and yet passes readily over these parts as shown in Fig. 1 of the drawings.

Mounted in tank 1 between suitable guides 17 are floats 18 preferably of cast iron, each float being provided with a hollow portion 19 loosely fitting between these guides and having horizontal flanges 20 adapted to limit the downward movement thereof. Between flanges 20 is a depressed portion 21 adapted to act as a way or guide for the upper portion of chain 13 and to support the same in a position determined in a measure by the height of the molten solder within the tank.

A can carrier or support 22 is positioned immediately above the upper portion of chain 13 and preferably comprises a pair of webs 23 provided with outwardly projecting flanges 24, and having secured thereto suitable straps 25, the webs, flanges, and straps being so formed and of such position as to bring their extremities substantially in a cylindrical outline. Upon this carrier are can bodies 26 driven by means of a sprocket chain 27 provided with outwardly projecting arms 28, each of which is adapted to engage and propel a can body. Chain 27 is mounted upon a sprocket wheel 29 borne by a short vertical shaft 30 journaled in a bearing 31 formed upon or secured to one of the walls of the tank. A bevel gear 32 upon the lower end of shaft 30 meshes with a similar gear 33 upon the shaft 4, and the propelling chain and solder applying chain are thus driven from the same source of power, the latter being applied to shaft 4 by means of spur gear 34 or other desired means.

Adjustably secured to the inner face of one of the webs 23, as by means of bolts 35 and slots 36, is a guide 37 adapted to engage the seam 38 of a can body 26 and perform functions hereinafter described.

It may here be noted that the term "buoyancy-controlled" is used throughout the following claims as descriptive of a member, the pressure of which against a neighboring body is controlled by its buoyance with reference to a fluid in which it is positioned, or by the buoyancy of another member connected therewith. It may also here be noted that the term "solder" is used throughout the following claims in an extremely broad sense to denote any material adapted to adhere to a metallic surface and seal a joint therein.

The method of using the above described embodiment of my invention is as follows: Assuming the solder to be in molten condition and the series of can bodies 26 to be positioned upon the carrier 22, these bodies and chain 13 are driven preferably in the same direction by the sprocket wheel mechanism, the floats 18 holding the blocks 14 against the can bodies 26 with the desired pressure, and the can bodies being driven at the desired rate. The chain passing alternately below and above the level of the solder transmits a portion thereof, which adheres to its heated surface, to the seams of the can bodies and presses and sweats the same between the meeting surfaces thereof. The chain is preferably driven at a slightly greater rate than that of the can bodies, thus affording a sliding contact which has a beneficial action in forming the joints, the relative rate of speed of the can bodies and blocks being determined by a suitable proportion of the bevel gears 32 and 33. As will be seen from an inspection of the drawing, the blocks 14 are at certain points in contact with the dependent edge of the guide 37 and consequently deposit solder upon the same. The can bodies sliding along the carrier 22 with their seams in contact with the lower edge of the guide, as shown in Fig. 6 of the drawings, take up this solder and hence are sealed along the inner edges of the seam, this action resulting in a highly efficient joint.

It will thus be seen that I have provided a simple and efficient piece of apparatus which is continuous in action and is substantially unaffected by the contraction or expansion of the several parts thereof. It will also be seen that the joint formed by the apparatus embodying my invention is far more reliable than those joints in which the solder is sweated into the seam on one side only.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

Having described my invention, what I claim as new and desire to secure by Letters Patent is:—

1. In apparatus of the class described, in combination, means adapted to support a can body, a receptacle, a flexible member adapted to transmit solder from said receptacle to said can body, and a float within said receptacle adapted to hold a portion of said flexible member in engagement with said can body.

2. In apparatus of the class described, in combination, means adapted to support a can body, a receptacle, a flexible member adapted to transmit solder from said receptacle to said can body, a float within said receptacle adapted to hold a portion of said flexible member in engagement with said can body, and means adapted to drive said can body and said flexible member at different rates of speed.

3. In apparatus of the class described, in combination, means adapted to support a can body and permit the same to travel in a longitudinal direction, a guiding member upon said first-mentioned means adapted to co-act with the inner surface of the longitudinal seam of said can body, a receptacle, and a movable member adapted to apply solder to the outer surface of said can body and the lower edge of said guiding member.

4. In apparatus of the class described, in combination, means adapted to support a can body and permit the same to travel in a longitudinal direction, a guiding member upon said first-mentioned means adapted to co-act with the inner surface of the longitudinal seam of said can body, a receptacle, a movable member adapted to apply solder to the outer surface of said can body and the lower edge of said guiding member, and a float within said receptacle adapted to tend to force said movable member into engagement with said can body.

5. In apparatus of the class described, in combination, means adapted to support a can body and permit the same to travel in a longitudinal direction, a guiding member upon said first-mentioned means adapted to co-act with the inner surface of the longitudinal seam of said can body, a receptacle, a movable member adapted to apply solder to the outer surface of said can body and the lower edge of said guiding member, and means adapted to drive said movable member and said can body in substantially the same directions at different rates of speed.

6. In apparatus of the class described, in combination, means adapted to support a can body and permit the same to travel in a longitudinal direction, a guiding member upon said first-mentioned means adapted to co-act with the inner surface of the longitudinal seam of said can body, a receptacle, a movable member adapted to apply solder to the outer surface of said can body and the lower edge of said guiding member, means adapted to drive said movable member and said can bodies in substantially the same direction at different rates of speed, and a float within said receptacle adapted to tend to force said movable member into engagement with said can body.

7. In a machine of the class described, in combination, means adapted to hold an article to be soldered, a receptacle, means adapted to transmit solder from said receptacle to said article, and a float in said receptacle adapted to press said transmitting means into engagement with said article.

8. In a machine of the class described, in combination, means adapted to hold an article to be soldered, means adapted to apply solder to said article, and buoyancy-controlled means adapted to press said solder-applying means into engagement with said article.

9. In a machine of the class described, in combination, means adapted to hold an article to be soldered, a receptacle, continuously acting means adapted to transmit solder from said receptacle to said article, and a float in said receptacle adapted to press said transmitting means into engagement with said article.

10. In a machine of the class described, in combination, means adapted to hold an article to be soldered, means adapted to have a sliding contact with said article and apply solder thereto, and buoyancy-controlled means adapted to press said solder-applying means into engagement with said article.

11. In a machine of the class described, in combination, means adapted to hold an article to be soldered, a receptacle, means adapted to transmit solder from said receptacle to said article, said means being adapted to have a sliding contact with said article, and a float in said receptacle adapted to press said transmitting means into engagement with said article.

12. In a machine of the class described, in combination, means adapted to hold an article to be soldered, a receptacle, continuously acting means adapted to transmit solder from said receptacle to said article, said continuously acting means being adapted to have a sliding contact with said article, and a float in said receptacle adapted to press said transmitting means into engagement with said article.

13. In a machine of the class described, in combination, means adapted to hold an article to be soldered, a receptacle, continuously acting means adapted to transmit solder from said receptacle to said article, said continuously acting means being adapted to have a sliding contact with said article, and a float in said receptacle adapted to press said transmitting means into engagement with said article, said receptacle being provided with guides for said float.

14. In a machine of the class described, in combination, means adapted to hold an article to be soldered, a receptacle, guides within said receptacle, continuously acting means adapted to transmit solder from said receptacle to said article, and a float in said receptacle adapted to press said transmitting means into engagement with said article, said float comprising a dependent hollow portion between said guides and flanges adapted to rest upon the tops of said guides and limit the downward movement of said float.

15. In a machine of the class described, in combination, a receptacle, means adapted to support and guide a can body adjacent thereto, a flexible member mounted adjacent said receptacle and adapted to transmit solder therefrom to said can body, the upper portions thereof being adapted to contact said can body, means adapted to propel said can body upon said supporting means, and means adapted to drive said flexible member, said last-mentioned means being adapted to move the upper portion of said flexible member at a greater rate of speed than that of said can body.

16. In a machine of the class described, in combination, a receptacle, means adapted to support a can body adjacent said receptacle and adapted to transmit solder therefrom to said can body, a flexible member mounted upon rotatable members journaled adjacent said receptacle, and means for propelling said can body and driving said flexible member at different rates of speed.

17. In a machine of the class described, in combination, means adapted to support a can body and permit a movement of said body relative thereto, a receptacle adjacent the same, stationary means upon said first-mentioned means adapted to apply solder to the inner surface of a seam in said body and means adapted to transmit solder from said receptacle to the outer surface of said seam and to said second-mentioned means.

18. In a machine of the class described, in combination, means adapted to support a series of can bodies and permit a movement of said bodies relative thereto, means adapted to propel said can bodies, a fixed seam guide upon said first-mentioned means adapted to apply solder to the inner surfaces of the seams in said bodies and remain in continuous engagement with said seams, a receptacle adjacent said first means, and means adapted to transmit solder from said receptacle to the outer surface of said seams and to said seam guide.

19. In a machine of the class described, in combination, means adapted to support a series of can bodies and permit a movement of said bodies relative thereto, means adapted to propel said can bodies, solder-applying means adapted to co-act with the outer surfaces of said can bodies and continuously acting means adapted alternately to receive solder from said solder-applying means and apply the same to the inner surfaces of the seams in said bodies.

20. In a machine of the class described, in combination, means adapted to support a can body, solder-applying means adapted to co-act with the outer surface of said can body, and means adapted alternately to receive solder from said solder-applying means and apply the same to the inner surface of said can body.

21. In a machine of the class described, in combination, a member adapted to support and guide a series of can bodies, means adapted to propel said bodies upon said member, a guide upon said member adapted to co-act with a portion of the inner surfaces of said can bodies, and continuously acting solder-applying means adapted to co-act with the outer surface of seams of said can bodies, and adapted to deposit solder upon said guide, said guide being adapted to redeposit the solder within said can bodies.

22. In a machine of the class described, in combination, a receptacle, means adapted to support an article to be soldered adjacent said receptacle, and a flexible member, portions of which are adapted alternately to contact the article on said support and to descend into said receptacle.

23. In a machine of the class described, the combination with a support for can bodies, of a molten solder receptacle below said support, means for moving can bodies lengthwise along said support and adjacent said receptacle, a flexible heat-resisting solder-applying member mounted movably within said solder receptacle and adapted to move through the molten solder therein, the upper portion of said flexible member adapted to project above the molten solder and to move in the same direction and approximately parallel to the path of movement of the can bodies, substantially as specified.

24. In a machine of the class described, the combination with a molten solder receptacle, of a member above said receptacle adapted to support and guide can bodies above and adjacent to said receptacle, a flexible solder-applying member mounted movably within said receptacle, said flexible member having a lower portion within the molten solder, and an upper portion projecting above the molten solder and adapted to contact with the can bodies and apply solder thereto, and means for moving said flexible member to cause the upper portion thereof to move in a path approximately parallel to that of the can bodies as they may be moved along said support, substantially as specified.

25. In a machine of the class described, in combination, a receptacle, a member adapted to support and guide a can body adjacent thereto, a chain mounted in said receptacle, the upper portion thereof being adapted to contact and apply solder to said can body, means adapted to propel said can body upon said supporting member, and means adapted to drive said chain at a differential rate with respect to the rate of travel of said can bodies.

26. In a machine of the class described, in combination, a receptacle, a member adapted to support and guide a can body adjacent thereto, a chain mounted in said receptacle, the upper portion thereof being adapted to contact said can body, means adapted to propel said can body upon said supporting member, and means adapted to drive said chain, said last-mentioned means being adapted to move the upper portion of said chain at a greater rate of speed than that of said can body.

27. In a machine of the class described, in combination, a receptacle, means adapted to support a can body adjacent said receptacle, a chain mounted upon rotatable members journaled within said receptacle, and means for propelling said can body and driving said chain, said chain comprising alternate blocks and links, and the outer surfaces of said blocks being substantially flat.

28. In a machine of the class described, in combination, a receptacle, means adapted to support a can body adjacent said receptacle, a chain mounted upon rotatable members journaled within said receptacle, and means for propelling said can body and driving said chain, said chain comprising alternate blocks and links, the outer surfaces of said blocks being substantially flat and said links being substantially inclosed by inwardly extending flanges formed on said blocks.

29. In a machine of the class described, in combination, means adapted to support an article to be soldered, means adapted simultaneously to apply solder to the inner and outer surfaces of a seam in the same, and buoyancy controlled means adapted to press a part of said solder applying means into engagement with said article.

30. In a machine of the class described, in combination, means adapted to support a can body and permit a movement of said body relative thereto, means upon said first-mentioned means adapted to apply solder to the inner surface of a seam in said body, means adapted to apply solder to the outer surface of said seam, and buoyancy controlled means adapted to press said last-mentioned solder applying means into engagement with said can.

31. In a machine of the class described, in combination, means adapted to support an article to be soldered and permit a movement of said article relative thereto, a receptacle, means upon said first-mentioned means adapted to apply solder to the inner surface of a seam in said article, means adapted to transmit solder from said receptacle to the outer surface of said seam, and a float in said receptacle adapted to press said transmitting means into engagement with said article.

32. In a machine of the class described, in combination, means adapted to hold an article to be soldered, a receptacle, means to transmit solder from said receptacle to said article, a float in said receptacle adapted to press said transmitting means into engagement with said article, and means adapted alternately to receive solder from said solder transmitting means and apply the same to the inner surface of a seam in said article.

33. In a machine of the class described, in combination, means adapted to hold an article to be soldered, a receptacle, a movable chain a portion of which is within said receptacle and a portion of which is adapted to contact with said article, and a float in said receptacle adapted to press said chain into engagement with said article.

34. In a machine of the class described, in combination, means adapted to hold an article to be soldered, a receptacle, a flexible member a portion of which is within said receptacle and a portion of which is adapted to contact said article, a float in said receptacle adapted to press said flexible member into engagement with said article, means adapted to propel said article along the member upon which it is positioned, and means adapted to drive the portion of said flexible member contacting said article at a higher rate of speed.

35. In a machine of the class described, in combination, means adapted to support an article to be soldered, a receptacle, a chain comprising a series of blocks a portion of which is within said receptacle and a portion of which is adapted to contact said article, a float within said receptacle adapted to press said chain into engagement with said article, means adapted to propel said article along the member upon which it is supported, and means adapted to drive said blocks in contact with said article at a higher rate of speed.

36. In a machine of the class described, in combination, means adapted to support the can body and permit a movement of said body relative thereto, a receptacle, a chain comprising a series of blocks, a portion of which is within said receptacle and a portion of which is adapted to contact said article, a float within said receptacle adapted to press said chain into engagement with said article, means adapted to propel said article along the member upon which it is supported, and means adapted to drive said chain in the same direction in which said member is propelled and at a higher rate of speed.

37. In a machine of the class described, in combination, means adapted to support a can body and permit a movement of said body relative thereto, means upon said first-mentioned means adapted to apply solder to the inner surface of a seam in said body, a receptacle and a chain mounted adjacent said receptacle a portion of which is within the same and a portion of which is adapted to contact said can body and apply solder to the outer surface of a seam therein.

38. In a machine of the class described, in combination, means adapted to support a can body and permit a movement of said body relative thereto, means upon said first-mentioned means adapted to apply solder to the inner surface of a seam in said body, a receptacle, a flexible member mounted adjacent said receptacle, a portion of which is within the same and a portion of which is adapted to contact said can body, means adapted to propel said can body along the member upon which it is supported, and means adapted to drive said flexible member at a higher rate of speed, said body and said chain being driven from a common source of power.

39. In a machine of the class described, in combination, means adapted to support a can body and permit a movement of said body relative thereto, stationary adjustable means upon said first-mentioned means adapted to apply solder to the inner surface of a seam in said body, a receptacle and continuously acting means adapted to supply said solder from said receptacle to the outer surface of said seam and to said adjustable means.

40. In a machine of the class described, in combination, means adapted to support an article to be soldered, a receptacle, solder-supplying means adapted to apply solder from said receptacle to the outer surface of a seam in said article, and means adapted alternately to receive solder from said solder-supplying means and apply the same to the inner surface of the seam in said article.

41. In a machine of the class described, in combination, means adapted to support an article to be soldered, solder supplying means adapted to apply solder to the outer surface of a seam in said article, means adapted alternately to receive solder from said solder-supplying means and apply the same to the inner surface of said seam, and means driven from a common source of power adapted to propel said article along the member upon which it is supported and to drive said solder applying means in the same direction at a higher rate of speed.

42. In a machine of the class described, in combination, means adapted to support an article to be soldered and permit a movement of said article relative thereto, means upon said first-mentioned means adapted to apply solder to the inner surface of a seam in said article, a receptacle, a flexible member adapted to transmit solder from said receptacle to the outer surface of said seam, and a float in said receptacle adapted to press said solder transmitting means into engagement with said article.

43. In a machine of the class described, in combination, means adapted to support a can body and permit a movement of said body relative thereto, a receptacle, means upon said first-mentioned means adapted to apply solder to the inner surface of a seam in said body, a flexible member mounted adjacent said receptacle a portion of which is within the same and a portion of which is adapted to contact and apply solder to the outer surface of said seam, and buoyancy controlled means adapted to press said flexible member into engagement with said can body.

44. In a machine of the class described, in combination, means adapted to support a can body and permit a movement of said body relative thereto, a receptacle, means upon said first-mentioned means adapted to apply solder to the inner surface of a seam in said body, a flexible member mounted adjacent said receptacle a portion of which is within the same and a portion of which is adapted to contact and apply solder to the outer surface of said seam, and buoyancy controlled means adapted to press said flexible member into engagement with said can body, said means upon said first-mentioned means being adjustable with reference thereto.

45. In a machine of the class described, in combination, means adapted to support a can body and permit a movement of said body relative thereto, adjustable means upon said first-mentioned means adapted to apply solder to the inner surface of a seam in said body, a receptacle and a chain mounted adjacent said receptacle, a portion of which is within the same and a portion of which is adapted to contact said can body, a float in said receptacle adapted to press said chain into engagement with said can body, and means driven from a common source of power adapted to propel said can body along the member upon which it is supported and to drive the portion of said chain in contact with said can body in the same direction and at a higher rate of speed.

46. In a machine of the class described, in combination, a receptacle, a member adapted to support a can body adjacent said receptacle and permit a longitudinal movement of said can body with respect to said receptacle, means mounted adjacent said receptacle adapted to transmit solder from said receptacle to a seam in said can body, positively acting means adapted to propel said can body along said supporting member, and positively acting means adapted to drive said solder applying member in substantially the same direction as said can body and at a different rate of speed.

47. In a machine of the class described, the combination with a support for can bodies, of means for moving the can bodies lengthwise along said support, a molten solder receptacle below said support, a movable solder applying and sweating device within said receptacle, and means for longitudinally moving said solder applying and sweating device in contact with and parallel to the can seams to sweat the solder therein and also for moving said device into and out of the molten solder to apply the solder to the seams of the can bodies, substantially as specified.

48. In a machine of the class described, the combination with a support for can bodies, of means for moving the can bodies lengthwise along said support, a molten solder receptacle below said support, and a plurality of movable solder applying and sweating blocks in said receptacle, and means for moving said solder applying and sweating blocks in contact with and parallel to the can seams to sweat the solder therein and also for moving them up and down to cause their solder applying and sweating faces to be alternately immersed in and projected above the molten solder in said receptacle, substantially as specified.

49. In a machine of the class described, the combination with means adapted to support articles to be soldered, of means for moving them along said support, a molten solder receptacle below said support, a movable device in said receptacle and having a solder applying and sweating face adapted to be moved lengthwise of and parallel to said support in contact with the articles to be soldered to sweat the solder into the seams, said device being also adapted to be moved up and down to alternately immerse in and project above the molten solder its solder applying and sweating face, substantially as specified.

50. In a machine of the class described, the combination with a can support and means for moving cans along said support, of a molten solder receptacle below said support, a plurality of movable solder applying and seam sweating blocks in said receptacle, and means for moving said blocks both up and down to bring their solder applying faces alternately above and below the level of the molten solder and also lengthwise of said support and in contact with the can seams to sweat the solder into the same, substantially as specified.

51. In a machine of the class described, the combination with a support for can bodies, of means for moving the can bodies lengthwise along said support, a molten solder receptacle below said support, and a plurality of movable solder applying and sweating blocks in said receptacle, and means for moving said solder applying and sweating blocks in contact with and parallel to the can seams to sweat the solder therein and also for moving them up and down to cause their solder applying and sweating faces to be alternately immersed in and projected above the molten solder in said receptacle, said solder applying and sweating blocks being pivotally connected together and forming an endless chain, substantially as specified.

52. In a machine of the class described, the combination with a can support, and means for moving cans along said support of a molten solder receptacle below said support, a plurality of movable solder applying and seam sweating blocks in said receptacle and means for moving said blocks both up and down to bring their solder applying faces alternately above and below the level of the molten solder and also lengthwise of said support and in contact with the can seams to sweat the solder into the same, said solder applying and sweating blocks being linked together and forming an endless chain, substantially as specified.

In testimony whereof I affix my signature, in the presence of two witnesses.

CHARLES W. GRAHAM.

Witnesses:
W. O. FORD,
E. H. CARTER.